US008060708B2

(12) United States Patent
Maheshwari et al.

(10) Patent No.: US 8,060,708 B2
(45) Date of Patent: *Nov. 15, 2011

(54) MULTIPROCESSOR SYSTEM HAVING AN INPUT/OUTPUT (I/O) BRIDGE CIRCUIT FOR TRANSFERRING DATA BETWEEN VOLATILE AND NON-VOLATILE MEMORY

(75) Inventors: Dinesh Maheshwari, Fremont, CA (US); Dinesh Ramanathan, San Jose, CA (US); Alakesh Chetia, Saratoga, CA (US); Herve Letourneur, Mountain View, CA (US); Donald W. Smith, Santa Clara, CA (US); Manoj Gujral, Los Altos, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,712

(22) Filed: May 28, 2010

(65) Prior Publication Data
US 2010/0312952 A1    Dec. 9, 2010

Related U.S. Application Data

(63) Continuation of application No. 11/465,698, filed on Aug. 18, 2006, now Pat. No. 7,730,268.

(51) Int. Cl.
*G06F 12/00* (2006.01)
(52) U.S. Cl. ............ 711/154; 711/157; 711/5; 711/103; 711/104; 711/105
(58) Field of Classification Search .................. 711/154, 711/102, 104, 5, 103, 105, 157; 703/13, 703/23
See application file for complete search history.

(56) References Cited

U.S. PATENT DOCUMENTS

| 6,744,692 | B2 |    | 6/2004 | Shiota et al. |
|-----------|----|----|--------|---------------|
| 6,954,821 | B2 | *  | 10/2005 | Fitzsimmons et al. ........ 710/317 |
| 7,165,159 | B2 |    | 1/2007 | Takemae |
| 7,171,526 | B2 |    | 1/2007 | Cruz |

(Continued)

FOREIGN PATENT DOCUMENTS
EP    1286263 A1    2/2003
(Continued)

OTHER PUBLICATIONS

The Written Opinion of the International Searching Authority for International Application No. PCT/US2007/075238 dated Feb. 7, 2008; 5 pages.

(Continued)

*Primary Examiner* — Hong Kim

(57) ABSTRACT

A disclosed circuit includes circuitry for coupling to a volatile memory, circuitry for coupling to a nonvolatile NAND flash memory, and circuitry that: (i) receives a volatile memory request from a processor and satisfies the volatile memory request by accessing the volatile memory, and (ii) receives a nonvolatile NOR flash memory read request from the processor and satisfies the NOR read request by accessing both the NAND flash memory and the volatile memory. The circuit may also include circuitry that receives a volatile memory request from another processor and satisfies the volatile memory request from the other processor by accessing the volatile memory, and circuitry that receives a NAND flash memory read request from the other processor and satisfies the NAND read request by accessing the NAND flash memory. Multiprocessor systems including the circuit are described, as is a method for satisfying a NOR flash memory read request.

20 Claims, 7 Drawing Sheets

U.S. PATENT DOCUMENTS

| | | |
|---|---|---|
| 7,222,282 B2 | 5/2007 | Park |
| 7,475,184 B2 | 1/2009 | Lee |
| 7,496,377 B2 | 2/2009 | Kwon |
| 7,610,433 B2 | 10/2009 | Randell et al. |
| 7,730,268 B2 * | 6/2010 | Maheshwari et al. ........ 711/154 |
| 7,752,380 B2 | 7/2010 | Avraham et al. |
| 2003/0206442 A1 | 11/2003 | Tang et al. |
| 2004/0054864 A1 | 3/2004 | Jameson |
| 2005/0185472 A1 * | 8/2005 | Randell et al. ........... 365/185.33 |
| 2005/0204091 A1 | 9/2005 | Kilbuck et al. |
| 2005/0273589 A1 | 12/2005 | Gong |
| 2006/0047914 A1 | 3/2006 | Hofmann et al. |
| 2006/0053246 A1 * | 3/2006 | Lee ............................... 711/100 |
| 2006/0294295 A1 | 12/2006 | Fukuzo |

FOREIGN PATENT DOCUMENTS

| | | |
|---|---|---|
| WO | 2005/076137 A1 | 8/2005 |

OTHER PUBLICATIONS

International Search Report for International Application No. PCT/US2007/075238 dated Feb. 7, 2008; 4 pages.

* cited by examiner

MULTIPROCESSOR SYSTEM HAVING AN INPUT/OUTPUT (I/O) BRIDGE CIRCUIT FOR TRANSFERRING DATA BETWEEN VOLATILE AND NON-VOLATILE MEMORY

RELATED APPLICATIONS

The present application is a continuation of U.S. Patent Application Ser. No. 11/465,698, filed Aug. 18, 2006, now U.S. Pat. No. 7,730,268.

BACKGROUND OF THE INVENTION

1. Field of the Invention

This invention relates to data processing systems, and more specifically to memory and input/output (I/O) systems used in data processing and for transmitting data between processors and providing a more cost effective shared volatile and non-volatile memory access architecture for use by a multiprocessor system.

2. Description of the Related Art

The following descriptions and examples are not admitted to be prior art by virtue of their inclusion within this section.

A typical computer system includes at least one processor coupled to a memory system including both volatile memory and nonvolatile memory. Volatile memory is memory that requires electrical power to maintain stored data. Examples of volatile memory are dynamic random access memory (DRAM) and static random access memory (SRAM).

Nonvolatile memory is memory that is capable of maintaining stored data even when not receiving electrical power. Examples of nonvolatile memory include read only memory (ROM), flash memory, and devices including magnetic storage media such as hard disk drives and floppy disk drives.

The typical computer system relies on operating system software for direct control and management of hardware, basic system operations, and a foundation upon which to run application software. A typical operating system is quite large and is stored on a disk drive (e.g., a hard disk drive). The term "booting" refers to a bootstrapping process that loads and starts the operating system when electrical power is applied to the typical computer system (i.e., when the typical computer system is turned on). In the typical computer system, the bootstrapping process begins with the processor executing software instructions (i.e., "boot code") stored in the nonvolatile memory.

In general, flash memory is a form of nonvolatile electrically erasable programmable read only memory (EEPROM) that allows multiple memory locations to be erased or written in one programming operation. A flash memory is divided into contiguous groups of storage units called blocks. While individual storage units (e.g., bytes or words) can be read or programmed in a random access fashion, all the storage units of a given block are erased at the same time. Starting with a freshly erased block, any storage unit within that block can be programmed. Once a storage unit is programmed, the contents of the storage unit cannot be changed again until the entire block is erased. Flash memory is commonly used in flash memory cards, USB flash drives, portable music players, digital cameras, and mobile phones.

There are two main types of flash memory: NOR flash memory and NAND flash memory. NOR flash memory is an older technology, and NOR flash memory has a standard memory interface. The standard NOR flash memory interface allows access to any storage unit in the NOR flash memory at any given time. That is, a NOR flash memory is a random access memory, making NOR flash memory suitable for storage of computer instructions to be accessed by a processor and executed (e.g., boot code). Similar to RAM, DRAM or SDRAM accesses, NOR flash memory entails the typical chip select, followed by addressing of a word line, and reading from or writing to a storage cell via bit lines, etc. NOR flash memory access is therefore sometimes referred to as a "traditional" memory access.

Direct access of a memory by a processor to obtain instructions straight from the memory, without duplication of the instructions in an intermediate memory such as DRAM or SRAM, and execution of those instructions by the processor, is generally referred to as "execution in place" or "XIP." NOR flash memory is suitable for execution in place (XIP), and is often used to store boot code. For example, a set of cells can be selected within a particular block of the NOR flash storage array, and the information contained therein can be sent directly to the processor to fulfill XIP.

NAND flash memory, on the other hand, is a more dense technology, and NAND flash memory does not involve the typical memory access or memory interface associated with RAM, DRAM, SDRAM or NOR flash memories. A typical NAND flash memory interface allows only sequential access to stored data. Instead of being able to randomly access a storage cell or a block of storage cells, as in volatile RAM or non-volatile NOR, the minimum region accessible in NAND flash is a page, with multiple pages within a given block of data—similar to accessing a hard drive unit. As a result, a NAND flash memory is more suitable for mass storage and generally not suitable for storage of computer instructions to be accessed by a processor and executed (e.g., boot code). That is, NAND flash memory is generally not suitable for XIP.

The typical computer system includes several input/output (I/O) interfaces or ports for connecting to peripheral devices such as display screens or monitors, keyboards, pointing devices such as mice, disk drives, modems, and printers. Each port typically has an electrical interface with terminals in a defined physical arrangement for connecting to signal lines, and a protocol for sending and/or receiving signals via the electrical interface.

In order to meet data processing requirements that exceed the capability of a single processor, many computer systems include multiple processors. In such multiprocessor systems, two or more processors typically execute instructions simultaneously. Some of the processors may be dedicated to separate discrete tasks, and/or some of the processors may work together to accomplish a single task. For example, a multiprocessor system may include a main processor and a second co-processor that assists the main processor in performing certain types of operations. Exemplary co-processor operations include complex mathematical operations and graphic image processing operations.

SUMMARY OF THE INVENTION

A circuit is provided for sharing memory and allowing communication between execution units, or processors. The circuit can be considered a bridge between processors and, in addition, couples to both volatile and non-volatile memory. The volatile memory includes RAM, DRAM, SDRAM, and the non-volatile memory includes flash memory, such as NOR flash memory and NAND flash memory. Each processor includes a port that connects to either volatile, non-volatile or both volatile and non-volatile memory. Coupled to the port of each processor is a bridge input/output circuit hereof, that allows interprocessor communication, direct memory access (DMA) and also shared memory access. The shared memory can be the volatile and non-volatile memory storage arrays connected to the bridge.

Within the bridge is preferably a dual port RAM and a transaction interleaver. The dual port RAM allows data to be exchanged between the local memories of each processor. If however, data is shared between processors, a shared volatile and non-volatile memory is coupled to the bridge. Upon startup of the system, data that is desired to be accessible by a traditional SRAM or NOR accesses for use by, e.g., XIP, is emulated and copied from a more dense, and cheaper-per-bit NAND flash memory into SDRAM. Thereafter, when a SRAM or NOR access is initiated by one of the multiprocessors, the access is directed by the interleaver to the SDRAM. Similarly, if a SDRAM access occurs, such access takes place within the SDRAM, leaving any NAND accesses preferably directed to the NAND flash.

Shadowing the cheaper, and more dense storage of the NAND into a dedicated space within the SDRAM allows traditional SRAM or NOR accesses to the SDRAM but also allows for faster (sequential) accesses and cheaper storage for NAND accesses directly to the NAND memory. Transfers from non-volatile memory to volatile memory can occur through a DMA operation, and subsequent accesses to the shared memory space can occur from any of multiple processors coupled to the bridge circuit. The transaction interleaver places the command accesses in proper order from the first access to subsequent accesses within a sequence, for each processor requesting the shared memory. When the data is read from the SDRAM, for example, a return data control unit with first-in-first-out (FIFO) tags denotes the proper order in which the data was written via the interleaver. In this fashion, the returned data is maintained in its proper sequence for each processor, even though there may be several processors accessing the SDRAM, but in time-division multiplexed sequence relative to each other.

Thus, according to one embodiment, the bridge serves to satisfy a volatile memory request (e.g., SRAM request) by accessing a SDRAM, yet the data in the SDRAM was emulated from non-volatile memory (e.g., NAND flash). The bridge can also satisfy a nonvolatile NOR flash memory read request from the processor, and to satisfy the nonvolatile NOR flash memory read request by accessing a shadow-copied volatile memory from a non-volatile, high density and less costly nonvolatile NAND flash memory. In one embodiment, the circuit also includes circuitry adapted to receive a volatile memory request from another processor and to satisfy the volatile memory request from the other processor by accessing the volatile memory, and circuitry adapted to receive a nonvolatile NAND flash memory read request from the other processor and to satisfy the nonvolatile NAND flash memory read request by accessing the nonvolatile NAND flash memory. Multiprocessor systems including the circuit are also described, along with a method for satisfying a NOR flash memory read request.

According to another embodiment, the dense NAND flash memory can be shared with volatile SDRAM memory for cost benefit reasons. The interfaces within the bridge to the various processors include volatile and non-volatile memory interfaces, including the more traditional SRAM, SDRAM and NOR flash read/write interfaces and the block accessing using read/write registers associated with NAND flash. Either processor can perform volatile memory accesses that will access SDRAM, and either processor can do non-volatile memory accesses that can be shadowed in the SDRAM for NOR flash type non-volatile processor interfaces. The intent behind shadowing is to take the non-volatile XIP type code or random access data in a NOR chip and make it accessible through the volatile physical memory SDRAM. Nonvolatile data is maintained consistent in the NAND flash and SDRAM through DMA accesses between the physical SDRAM and physical NAND flash.

BRIEF DESCRIPTION OF THE DRAWINGS

Other objects and advantages of the invention will become apparent upon reading the following detailed description and upon reference to the accompanying drawings in which.

Figure 1:
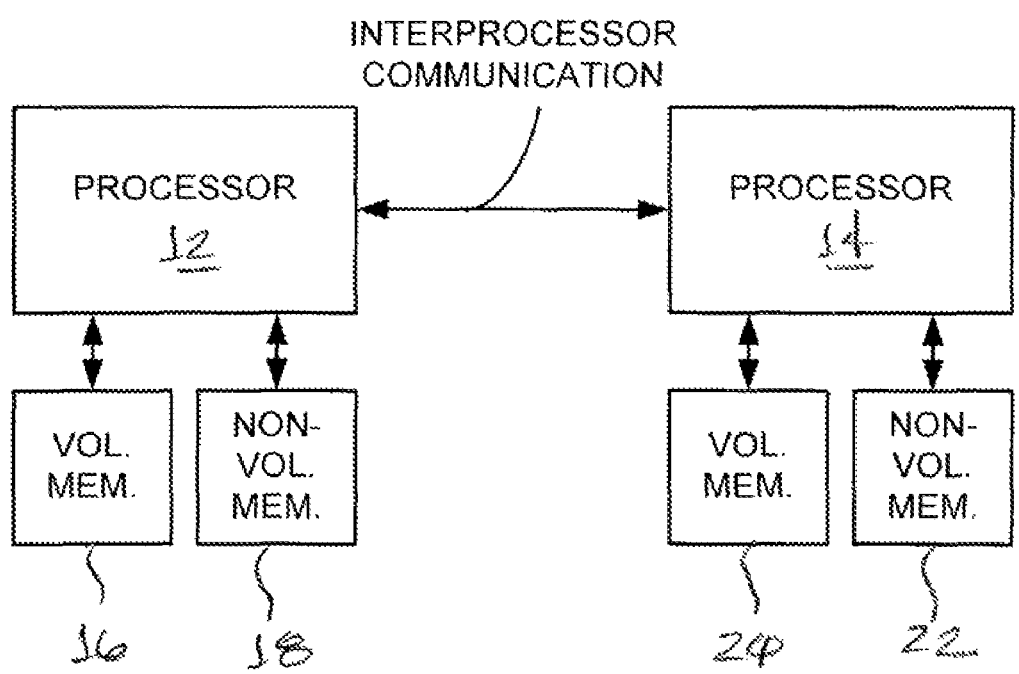
FIG. 1 is a diagram of one embodiment of a multiprocessor system including two processors, wherein each of the processors is coupled to separate volatile and nonvolatile memories.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIG. 1 is a diagram of one embodiment of a multiprocessor system 10 including two processors: a first processor 12 and a second processor 14. As is typical in many multiprocessor systems, both the processors 12 and 14 have their own volatile and nonvolatile memory. More specifically, the processor 12 is coupled directly to, and directly accesses, a volatile memory 16 and a nonvolatile memory 18. The processor 14 is coupled directly to, and directly accesses, a volatile memory 20 and a nonvolatile memory 22.

As indicated in FIG. 1, the processors 12 and 14 communicate via interprocessor communication. For example, the processors 12 and 14 communicate via universal asynchronous receiver transmitters (UARTs), or universal serial bus (USB) transceivers, or by messages passed via a dual port memory coupled to, and accessible by, both the processors 12 and 14.

The processors 12 and 14 can also exchange data via the interprocessor communication link. For example, data may be transferred between the volatile memory 16 and/or the nonvolatile memory 18, coupled to the processor 12, and the volatile memory 20 and/or the nonvolatile memory 22, coupled to the processor 14, via the interprocessor communication mechanism.

The multiprocessor system 10 of FIG. 1 has several drawbacks. When large amounts of data need to be transferred between memories via the interprocessor communication mechanism, the interprocessor communication mechanism typically consumes much of the processing capabilities of the processors 12 and 14. Each of the multiple memories represents a component that must be purchased and stocked, and the result is often a higher component costs. The multiple memories also occupy significant area on a substrate such as a printed circuit board. This relatively large "footprint" is a significant drawback in portable applications.

Figure 2:
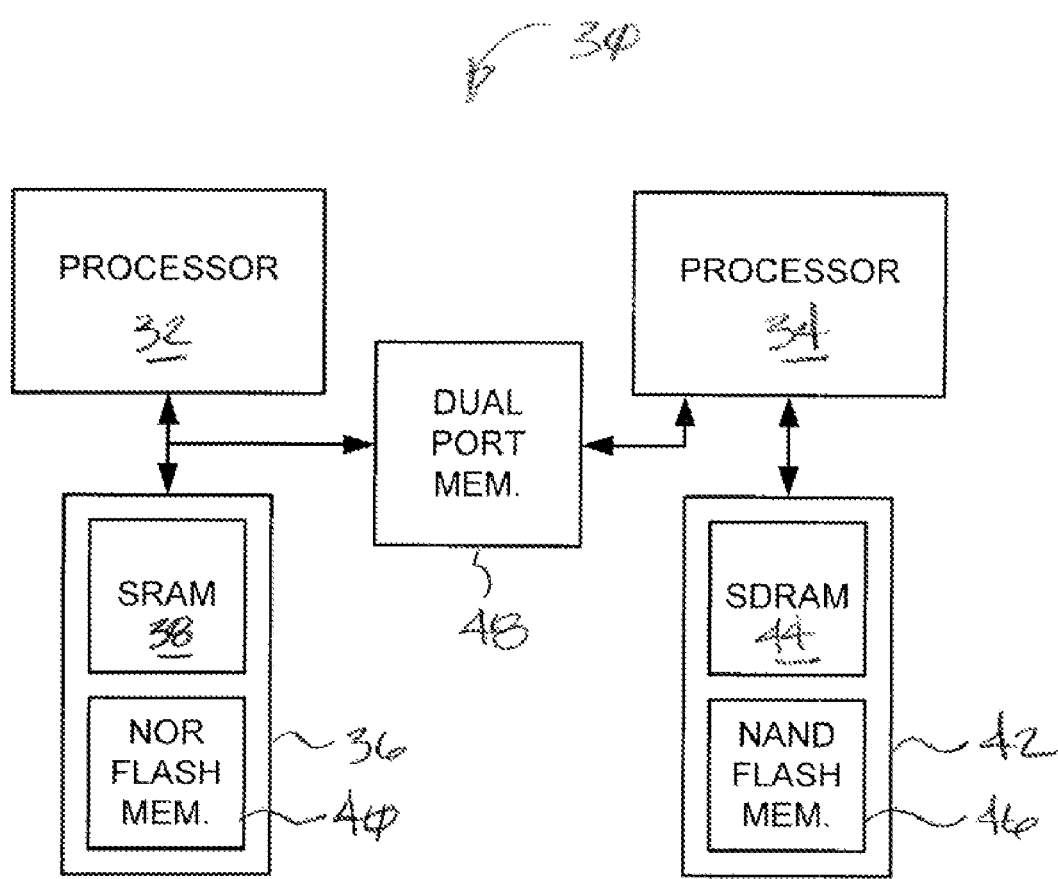
FIG. 2 is a diagram of one embodiment of a multiprocessor system including two processors, wherein each of the processors is coupled to one of two memory devices including both volatile and nonvolatile memory.

FIG. 2 is a diagram of one embodiment of a multiprocessor system 30 including a first processor 32 and a second processor 34. In the system 30 of FIG. 2, the processor 32 is coupled directly to, and directly accesses, a memory device 36 including a volatile static random access memory (SRAM) unit 38 and a nonvolatile NOR flash memory unit 40. The processor 34 is coupled directly to, and directly accesses, a memory device 42 including a volatile synchronous dynamic random access memory (SDRAM) unit 44 and a nonvolatile NAND flash memory unit 46.

The memory device 36, and/or the memory device 42, may be, for example, a multi-chip package (MCP). That is, the SRAM unit 38 of the memory device 36 may be formed on one integrated circuit die, and the nonvolatile NOR flash memory unit 40 may be formed on another integrated circuit die. The two dice may be integrated into a single MCP forming the memory device 36. Similarly, the SDRAM unit 44 and the NAND flash memory 46 may be formed on separated integrated circuit dice, and the two dice may be integrated into a single MCP forming the memory device 42. In the example shown, processor 32 may have a port that can perform random access indigenous with SRAM and NOR flash memories. Thus, processor 32 may be a legacy instruction execution unit, whereas processor 34 may be able to perform faster, non-traditional, block/page accesses using NAND flash memories, or sequential accesses using synchronous DRAM accesses. Memory system 42 is not only faster but also enjoys the benefit of increased density with less cost-per-bit storage, than system 36. Yet, in a multiprocessor system, one or more processors may have a more traditional memory access associated with system 36, and other processors may have a more modern memory access associated with system 42. It would be desirable that a multiprocessor system enjoy backward compatibility with traditional memory systems (and their access architecture), along with a more modern, cost effective (and faster) memory system.

Each of the processors 32 and 34 is also directly coupled to, and directly accesses, a dual port memory 48. The processors 32 and 34 communicate via the dual port memory 48, and can also transfer data via the dual port memory 48. For example, the processor 32 can send a message to the processor 34 by storing data conveying the message in a designated memory location of the dual port memory 48. The processor 34 can receive the message by reading the data from the designated memory location. The processor 34 can send a message to the processor 32 by reversing the process. In a similar manner, the processors 32 and 34 can also exchange data via the dual port memory 48. That is, data may be transferred between the memory device 36, coupled to the processor 32, and the memory device 42, coupled to the processor 34, via the dual port memory 48.

When the memory device 36 and/or the memory device 42 is an MCP, the multiprocessor system 30 of FIG. 2 has several advantages over the multiprocessor system 10 of FIG. 1. Fewer components need to be purchased and stocked, expectedly resulting in lower component costs. The multiple memories in a memory MCP are often vertically stacked one on top of the other. In this situation, the multiple memories of the multiprocessor system 30 occupy less area on a substrate (e.g., a printed circuit board) than the memories of the multiprocessor system 10. This relatively small footprint is a significant advantage in portable applications. It is noted that data transfers between the memory devices 36 and 42, carried out via the dual port memory 48, consume processing capabilities of the processors 32 and 34.

Figure 3:
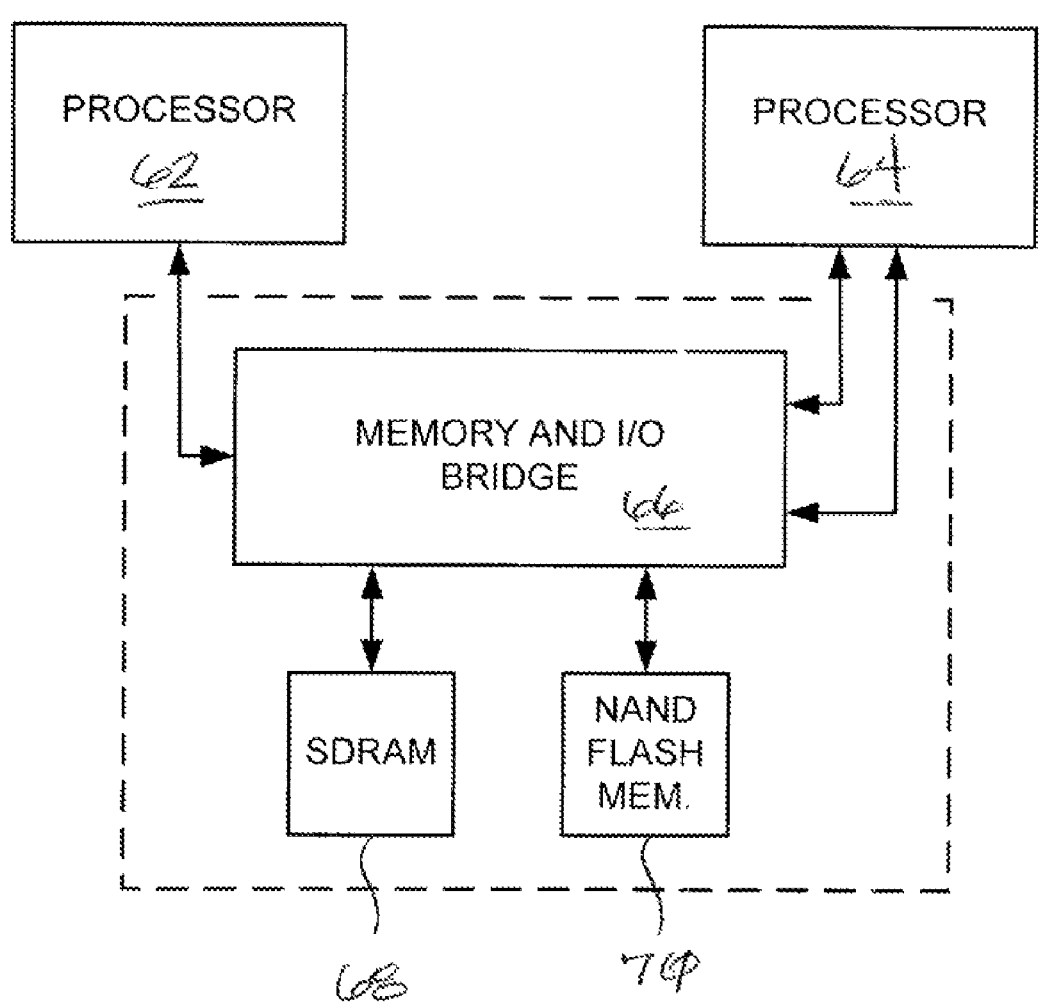
FIG. 3 is a diagram of one embodiment of a multiprocessor system including two processors, a memory and input/output (I/O) bridge, a volatile memory, and a nonvolatile memory, wherein both processors share the volatile memory and the nonvolatile memory via the bridge.

FIG. 3 is a diagram of one embodiment of a multiprocessor system 60 including a first processor 62 and a second processor 64. In the embodiment of FIG. 3, both the processor 62 and the processor 64 are coupled to a memory and input/output (I/O) bridge 66. The memory and I/O bridge 66 is coupled to an SDRAM 68 and a NAND flash memory 70. As described in more detail below, the processors 62 and 64 share the SDRAM 68 and a NAND flash memory 70 via the memory and I/O bridge 66. The processor 62 can be coupled to an SRAM/NOR interface of the memory and I/O bridge 66, and the processor 64 is coupled to two interfaces of the memory and I/O bridge 66: an SDRAM interface and a NAND flash memory interface. Processor 64 therefore accommodates a synchronous random access as well as block/page accessing. The ports of bridge 66 can be configured in various ways, one example of which is the configuration of FIG. 3. A configuration register associated with bridge 66 can be configured so that, upon startup, the ports are configured to interface with certain types of volatile or nonvolatile memory. Alternatively, the ports can be configured in the field or during manufacture to accommodate various types of volatile and non-volatile interface pins.

In general, the SDRAM 68 and the NAND flash memory 70 are shared by the processors 62 and 64 in a transparent fashion. That is, the memory and I/O bridge 66 satisfies memory requests from the processor 62 via SRAM access signals and protocol, and NOR flash memory access signals and protocol, using the SDRAM 68 and the NAND flash memory 70 such that the latency and timing requirements of the respective accesses are met. The memory and I/O bridge 66 also satisfies memory requests from the processor 64 via SDRAM access signals and protocol, and NAND flash memory access signals and protocol, using the SDRAM 68 and the NAND flash memory 70 such that the latency and timing requirements of the respective accesses are met.

As described in more detail below, the memory and I/O bridge 66 also includes I/O controllers and I/O interfaces that are available to the processor 62 and the processor 64. In one embodiment of the memory and I/O bridge 66 described below, the memory and I/O bridge 66 also includes a dual port RAM that can be used for interprocessor communication. Data stored locally in each processor can be sent between the local storage locations via the dual port RAM 116. Rather than transporting data between local memory (i.e., memory within processors 62 and 64), it is more advantageous that data be shared within volatile and non-volatile memories 68 and 70. Instead of having to perform up to six accesses when local data is transferred between processors via RAM 116, only 3 accesses are performed with drawing data from or placing data into the shared memory, the details of which are described below.

As indicated in FIG. 3, the memory and I/O bridge 66, the SDRAM 68, and the NAND flash memory 70 may be advantageously integrated to form a single device. For example, the memory and I/O bridge 66, the SDRAM 68, and the NAND flash memory 70 may be formed on separate integrated circuit die, and the three dice can be integrated to form the single device. Alternately, the memory and I/O bridge 66, the SDRAM 68, and the NAND flash memory 70 may be formed on the same integrated circuit die, and the die may be packaged to form the single device.

The multiprocessor system 60 of FIG. 3 has several significant advantages over the to multiprocessor system 30 of FIG. 2. As data stored in the SDRAM 68 and the NAND flash memory 70 is available to both the processors 62 and 64, interprocessor communication is not required to transfer data between memories. As a result, more of the processing capabilities of the processors 62 and 64 are available for other tasks (e.g., applications). Fewer components need to be purchased and stocked, expectedly resulting in even lower component costs. When the memory and I/O bridge 66 is made small enough, the memory and I/O bridge 66, the SDRAM 68, and the NAND flash memory 70 of the multiprocessor system 60 occupy less area on a substrate (e.g., a printed circuit board) than the memory device 36, the memory device 42, and the dual port memory 48 of the multiprocessor system 30. This smaller footprint than that of the multiprocessor system 30 makes the multiprocessor system 60 more desirable in portable applications.

Figure 4:
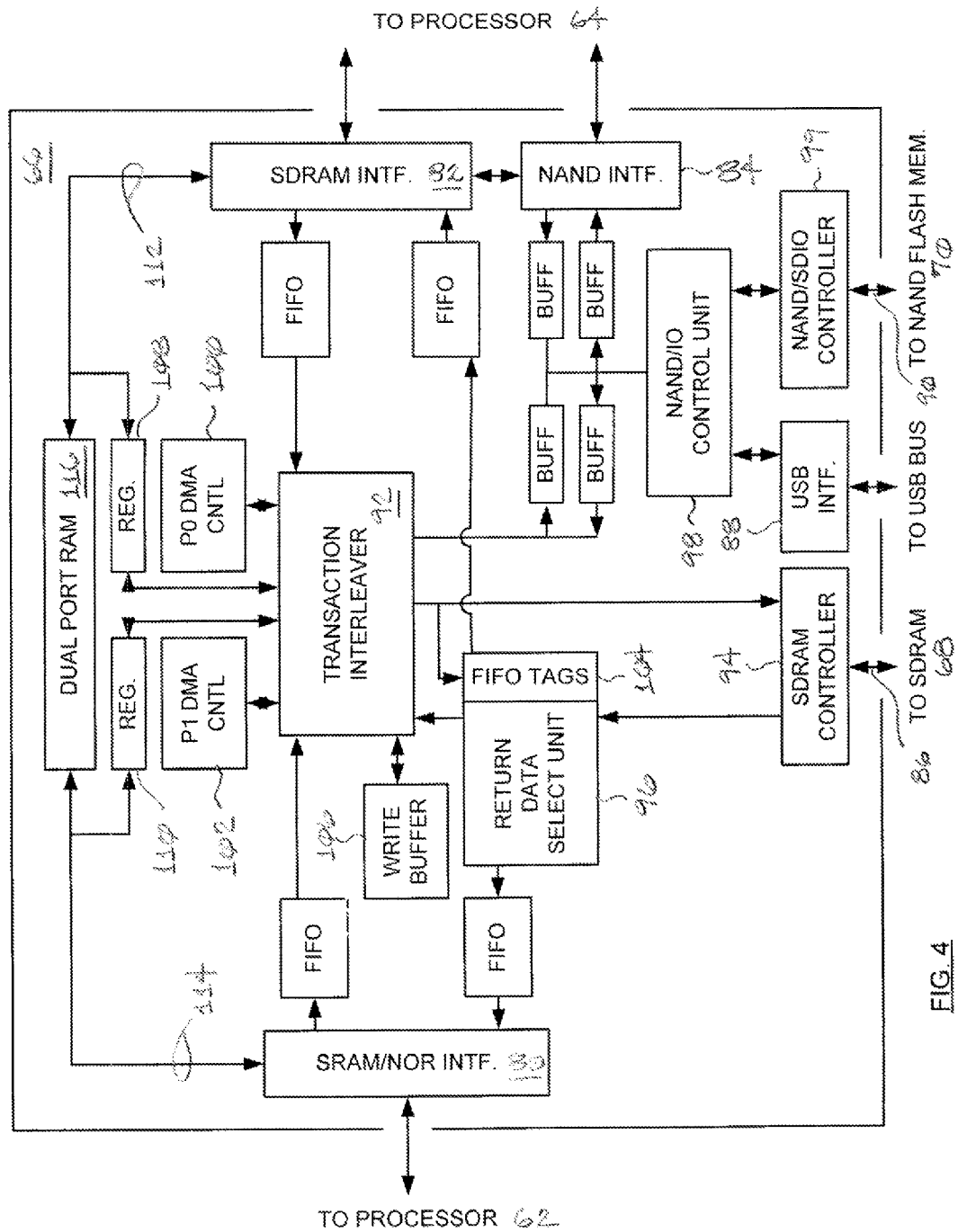
FIG. 4 is a diagram of one embodiment of the memory and I/O bridge of FIG. 3.

FIG. 4 is a diagram of one embodiment of the memory and I/O bridge 66 of FIG. 3. In the embodiment of FIG. 4, the memory and I/O bridge 66 includes an SRAM/NOR interface 80, a first SDRAM interface 82, a NAND flash memory interface (a "NAND interface") 84, a second SDRAM interface 86, a universal serial bus (USB) interface 88, and a NAND/SDIO interface 90. As indicated in FIG. 4, the processor 62 of FIG. 3 is coupled to the memory and I/O bridge 66 via the SRAM/NOR interface 80, and the processor 64 of FIG. 3 is coupled to the memory and I/O bridge 66 via the SDRAM interface 82 and the NAND interface 84. The SDRAM 68 of FIG. 3 is coupled to the SDRAM interface 86, and the NAND flash memory 70 of FIG. 3 is coupled to the NAND/SDIO interface 90.

In the embodiment of FIG. 4, the SRAM/NOR interface 80 captures address, data, and control signals of SRAM and NOR flash memory requests (i.e., external SRAM and NOR flash memory requests) from processor 62. The SDRAM interface 82 captures address, data, and control signals of SDRAM requests (i.e., external SDRAM requests) from the processor 64 of FIG. 3, and the NAND interface 84 captures address, data, and control signals of NAND flash memory requests (i.e., external NAND flash memory requests) from the processor 64. The SRAM/NOR interface 80, the SDRAM interface 82, and the NAND interface 84 translate external memory requests to internal memory requests. The resulting internal memory requests are provided to a transaction interleaver 92 via an input first-in-first-out (FIFO) buffer associated with each interface.

In general, the transaction interleaver 92 issues memory requests internal to the memory and I/O bridge 66 (i.e., "transactions") to the SDRAM 68 via an SDRAM controller 94, and to the NAND flash memory 70 via a NAND/IO control unit 98 and a NAND/SDIO controller 99, in an order such that the latency and timing requirements of the different types of memory are met. For read transactions directed to the SDRAM 68, the transaction interleaver 92 also provides transaction tracking information to a return data select unit 96. That is, the transaction interleaver 92 does not necessarily issue transactions to the SDRAM 68 via an SDRAM controller 94 in an order in which the corresponding external memory requests are received via the SRAM/NOR interface 80 and the SDRAM interface 82. This flexibility to issue transactions in a different order in which the corresponding external memory requests were received helps the memory and I/O bridge 66 meet the latency and timing requirements of the different types of external memory requests.

Within, the memory and I/O bridge 66, NOR flash memory is emulated as NAND flash memory. That is, when a read memory request is received from the processor 62 of FIG. 3 via the SRAM/NOR interface 80, and the memory request is directed to a NOR flash memory space, the NAND/IO control unit 98 retrieves a block of data including the requested data from the NAND flash memory 70 of FIG. 3, and stores the block of data in the SDRAM 68 of FIG. 3 via the transaction interleaver 92 and the SDRAM interface 86. The transaction interleaver 92 then generates a transaction for the requested data, and issues the transaction to the SDRAM 68 via the SDRAM controller 94. As a result, the requested data is retrieved from the SDRAM 68 and provided to the processor 62 via the SRAM/NOR interface 80 such that the latency and timing requirements of the NOR flash memory request are met.

Emulation of NOR or SRAM therefore occurs while physically sharing SDRAM and NAND memory device therefore provides for a lower overall system cost. This also accounts for some processors using SRAM and NOR interfaces (i.e., CRAM interfaces/protocols) and therefore allows support for older, legacy processor ports, yet also allows support for the newer ports that utilize SDRAM and NAND interfaces. The interleaver allows requests from both ports to be serviced, and provides a single stream of commands for access. The SDRAM controller 94 looks at the stream given to it and rearranges the sequence before giving the data back to the SRAM interface 80 or SDRAM interface 82.

Transfer of a block of data from NAND 70 to SDRAM 68 can occurs via DMA. A DMA can arise when, for example, port 1 (or port 0) initiates data transfer via DMA controller 102 (or 100). The NOR data can be written into NAND, or NAND data can be written into SDRAM. If that latter, the NAND data is said to be shadowed into a portion of SDRAM 68. Data from local memories of processors 62 and 64 can, likewise, be shadowed into SDRAM 68, for subsequent, faster access when needed. By shadowing the non-volatile memory (NAND 70) so that SDRAM controller 94 responds to an interleaved command from interleaver 92 whenever a NOR access occurs. The NOR access is directed to SDRAM 78, where NOR data was emulated or shadowed. All writes to non-volatile space are therefore also written to the corresponding SDRAM location.

When the memory and I/O bridge 66 is operating, the above method of emulating NOR flash memory as NAND flash memory allows booting of one or both of the processors 62 and 64 of FIG. 3 via boot instructions (i.e., boot code) stored in the NAND flash memory 70 and shadowed to SDRAM 68 during start up via DMA. Thus, when bootup occurs, the SDRAM 68 is accessed to perform XIP of computer code via SRAM accesses to SDRAM 68.

The NAND/SDIO interface 90 forms both a NAND flash memory interface and a secure digital I/O (SDIO) interface. That is, the NAND/SDIO interface 90 has an opening with connector terminals that can accept both NAND flash memory cards and SDIO cards. Available SDIO cards include devices such as wireless communication adapters, digital cameras, and global position system (GPS) receivers. The NAND/IO control unit 98 is coupled to, and controls, the NAND/SDIO controller 99. The NAND/SDIO controller 99 is coupled to the NAND/SDIO interface 90, and in the embodiment of FIG. 3 the NAND flash memory 70 is coupled to the NAND/SDIO interface 90. In other embodiments, an SDIO card including a device may be coupled to the NAND/SDIO interface 90, and the processors 62 and 64 of FIG. 3 may communicate with the device via the memory and I/O bridge 66.

The NAND/IO control unit 98 is also coupled to, and controls, the USB interface 88. The USB interface 88 may be coupled to a USB, and the processors 62 and 64 of FIG. 3 may communicate with one or more devices coupled to the USB via the memory and I/O bridge 66.

A port 0 of the memory and I/O bridge 66 includes the SDRAM interface 82 and the NAND interface 84, and a port 1 of the memory and I/O ridge 66 includes the SRAM/NOR interface 80. A port 0 direct memory access (DMA) controller 100 coupled to the transaction interleaver 92 handles DMA transactions between the SDRAM 68 and NAND flash memory 70. A port 1 direct memory access (DMA) controller 102 handles DMA transactions between the emulated SRAM space within SDRAM 68 and NAND flash memory 70. Port 0 DMA also allows an interface 82 and the NAND flash memory 70 of FIG. 3, between the SDRAM interface 82 and the SDRAM 68 of FIG. 3, between the NAND interface 84 and the NAND flash memory 70, and between the NAND interface 84 and the SDRAM 68. Port 1 DMA handles DMA transactions between the SRAM/NOR interface 80 and the NAND flash memory 70 of FIG. 3, and between the SRAM/NOR interface 80 and the SDRAM 68 of FIG. 3.

In addition, the port 0 DMA controller 100 and the port 1 DMA controller 102 work together to perform DMA transactions between the NAND flash memory 70 of FIG. 3 and the SDRAM 68 of FIG. 3, and from one portion of the SDRAM 68 to another portion of the SDRAM 68. For example, in a video rotation application, the port 0 DMA controller 100 and the port 1 DMA controller 102 work together to transfer video data from one portion of the SDRAM 68 to another portion of the SDRAM 68.

The return data select unit 96 receives read data obtained from the SDRAM 68 of FIG. 3 via the SDRAM controller 94, and provides the read data to either the processor 62 of FIG. 3 via the SRAM/NOR interface 80, or to the processor 64 of FIG. 3 via the SDRAM interface 82, dependent upon the source of the read transaction. The return data select unit 96 includes a tag FIFO 104 for tracking transactions. Each read transaction has a corresponding tag in the tag FIFO 104 indicating a source of the corresponding read transaction.

A write buffer 106 coupled to the transaction interleaver 92 provides a temporary store or cache for write transactions, helping the transaction interleaver 92 schedule transactions such that the latency and timing requirement of the different types of memory are met. The memory and I/O bridge 66 also include two configuration registers: a configuration register 108 for the port 0, and a configuration register 110 for the port 1. Data stored in the configuration registers 108 and 110 define how the components of the memory and I/O bridge 66 operate. The configuration register 108 is an addressable register accessible via a bus 112 extending from the SDRAM interface 82 and the NAND interface 84. The configuration register 110 is an addressable register accessible via a bus 114 extending from the SRAM/NOR interface 80.

For example, the configuration register 108 stores priority information for port 0 memory transactions, and the configuration register 110 stores priority information for port 1 memory transactions. The transaction interleaver 92 retrieves this priority information from the configuration registers 108 and 110, and uses this priority information to issue transactions to the SDRAM controller 94 and/or the NAND controller 99.

The memory and I/O bridge 66 also includes a dual port RAM 116 having multiple addressable memory locations accessible from both the port 0 (i.e., the SDRAM interface 82 and the band interface 84) and the port 1 (i.e., the SRAM/NOR interface 80). The memory locations of the dual port RAM 116 can be used to carry out interprocessor communication. That is, one of the processors 62 and 64 of FIG. 3 can store data (i.e., a user-defined message) in one or more of the memory locations of the dual port RAM, and the other of the processors 62 and 64 can retrieve this data from the dual port RAM 116. The dual port RAM 116 also facilitates granting exclusive access to the SDRAM 68 of FIG. 3 (ora portion of the SDRAM 68) to either the processor 62 or the processor 64 via data representing flags or semaphores stored in the memory locations of the dual port RAM 116.

As indicated in FIG. 4, the dual port RAM 116 is accessible via the bus 112 extending from the SDRAM interface 82 and the NAND interface 84, and via the bus 114 extending from the SRAM/NOR interface 80. As described in more detail below, the dual port RAM 116 is accessible from ports 0 and 1 via dedicated control signals. Portions of memory spaces can be flagged as protected. Within the memory and I/O bridge 66, an access to a protected portion of a memory space is trapped.

Figure 5:
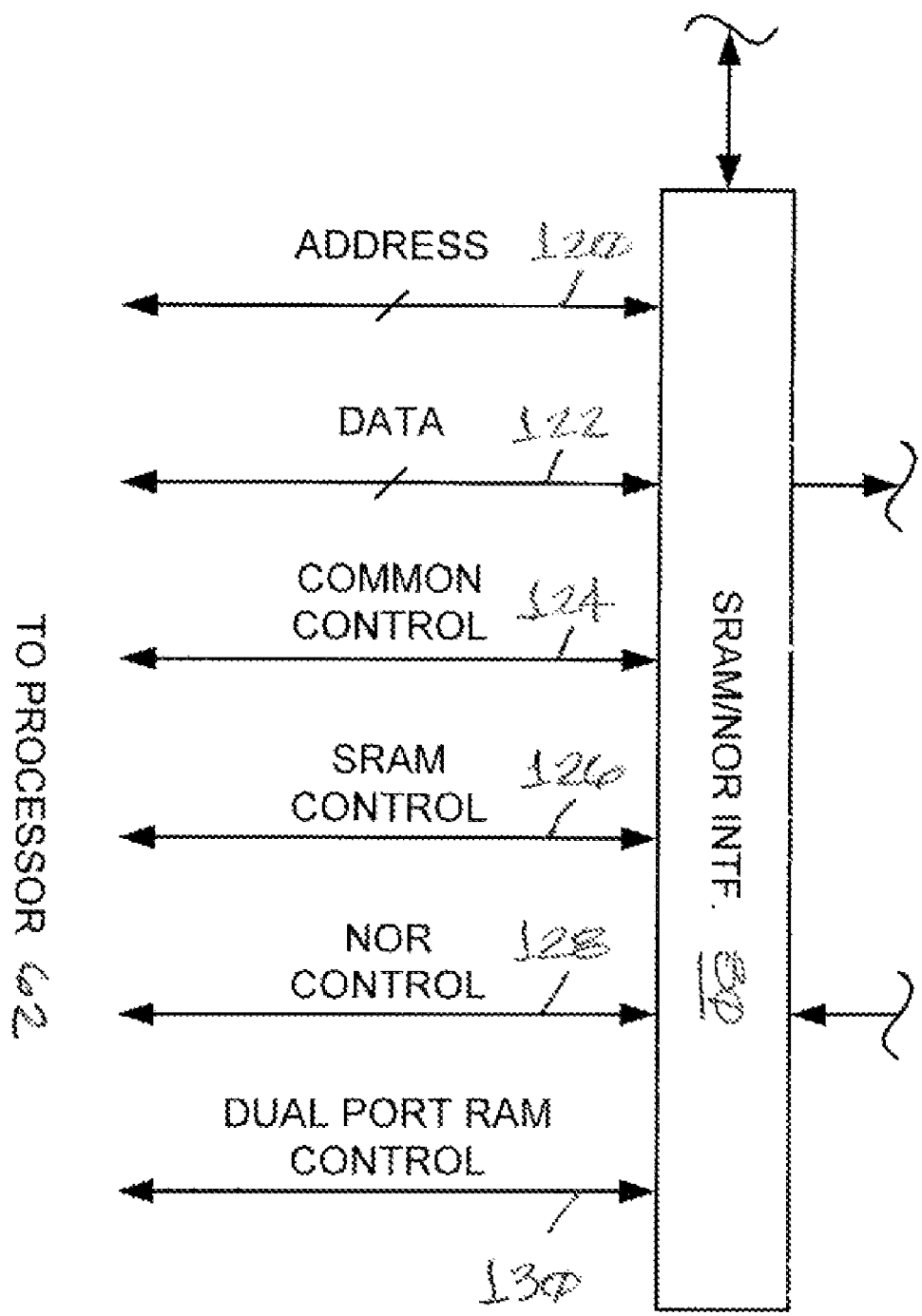
FIG. 5 is a diagram of one embodiment of an SRAM/NOR interface of the memory and I/O bridge of FIG. 4.

FIG. 5 is a diagram of one embodiment of the SRAM/NOR interface 80 of FIG. 4. In the embodiment of FIG. 5, the SRAM/NOR interface 80 receives address signals via multiple address lines 120, data signals via multiple data lines 122, one or more common control signal(s) via control line(s) 124, one or more SRAM control signal(s) via control line(s) 126, one or more NOR control signal(s) via control line(s) 128, and one or more dual port RAM control signal(s) via dual port RAM control line(s) 130. The address signals specify a particular address in either an SRAM address space, a NOR flash memory address space, or a dual port RAM address space. The data signals are used to convey data read from, or to be written to, the particular address specified by the address signals. The one or more common control signal(s) include control signals common to access of an SDRAM unit or device and a NOR flash memory unit or device. Exemplary common control signals include those used to access random bits of memory, for example.

The one or more SRAM control signal(s) include control signals used only to access an SRAM unit or device. Examples of SRAM control signals include SRAM select signals (e.g., chip select signals) and SRAM enable signals (e.g., chip enable signals).

The one or more NOR control signal(s) include control signals used only to access a NOR flash memory unit or device. Examples of NOR control signals include NOR flash memory select signals (e.g., chip select signals) and NOR flash memory enable signals (e.g., chip enable signals).

The one or more dual port RAM control signal(s) include control signals used only to access a dual port RAM unit or device. Examples of dual port RAM control signals include dual port RAM select signals (e.g., chip select signals) and dual port RAM enable signals (e.g., chip enable signals).

Figure 6:
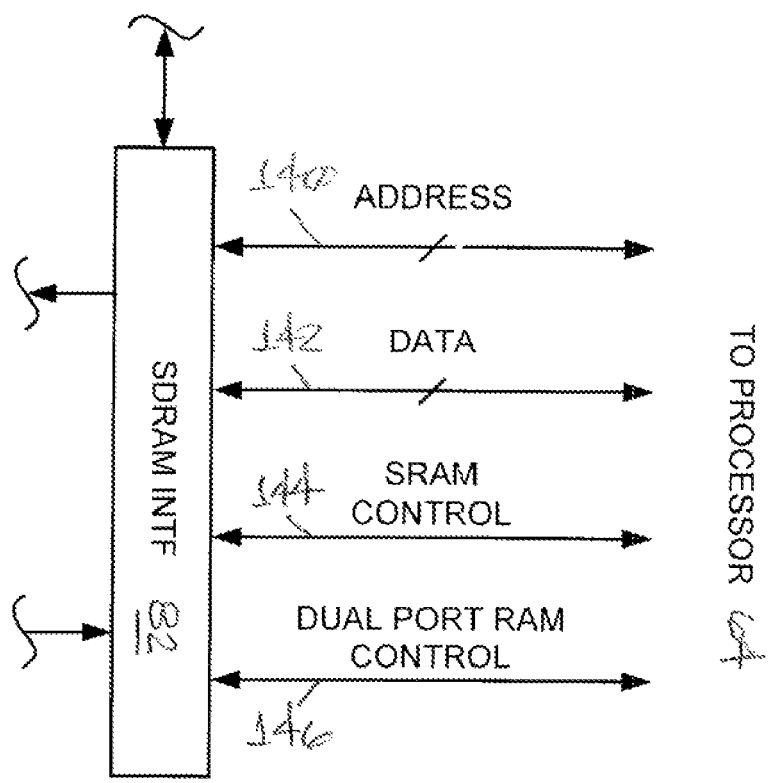
FIG. 6 is a diagram of one embodiment of an SDRAM interface of the memory and I/O bridge of FIG. 4.

FIG. 6 is a diagram of one embodiment of the SDRAM interface 82 of FIG. 4. In the embodiment of FIG. 6, the SDRAM interface 82 receives address signals via multiple address lines 140, data signals via multiple data lines 142, one or more SRAM control signal(s) via control line(s) 144, and one or more dual port RAM control signal(s) via dual port RAM control line(s) 146. The address signals specify a particular address in either an SRAM address space or a dual port RAM address space. The data signals are used to convey data read from, or to be written to, the particular address specified by the address signals.

Figure 7:
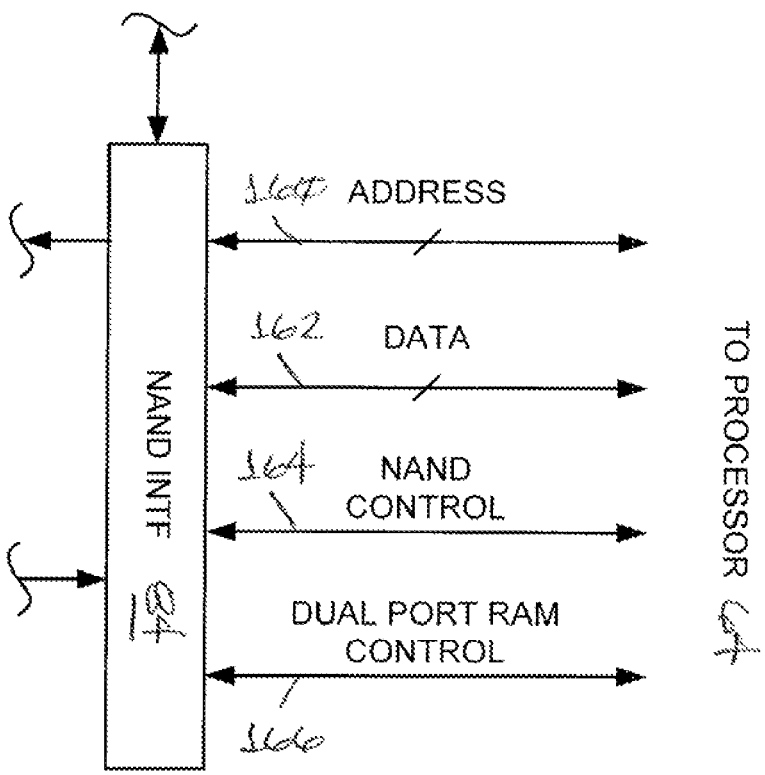
FIG. 7 is a diagram of one embodiment of a NAND flash memory interface of the memory and I/O bridge of FIG. 4.

FIG. 7 is a diagram of one embodiment of the NAND interface 84 of FIG. 4. In the embodiment of FIG. 7, the NAND interface 84 receives address signals via multiple address lines 160, data signals via multiple data lines 162, one or more NAND control signal(s) via control line(s) 164, and one or more dual port RAM control signal(s) via dual port RAM control line(s) 166. The address signals specify a particular address in either a NAND address space or a dual port RAM address space. The data signals are used to convey data read from, or to be written to, the particular address specified by the address signals.

Figure 8:
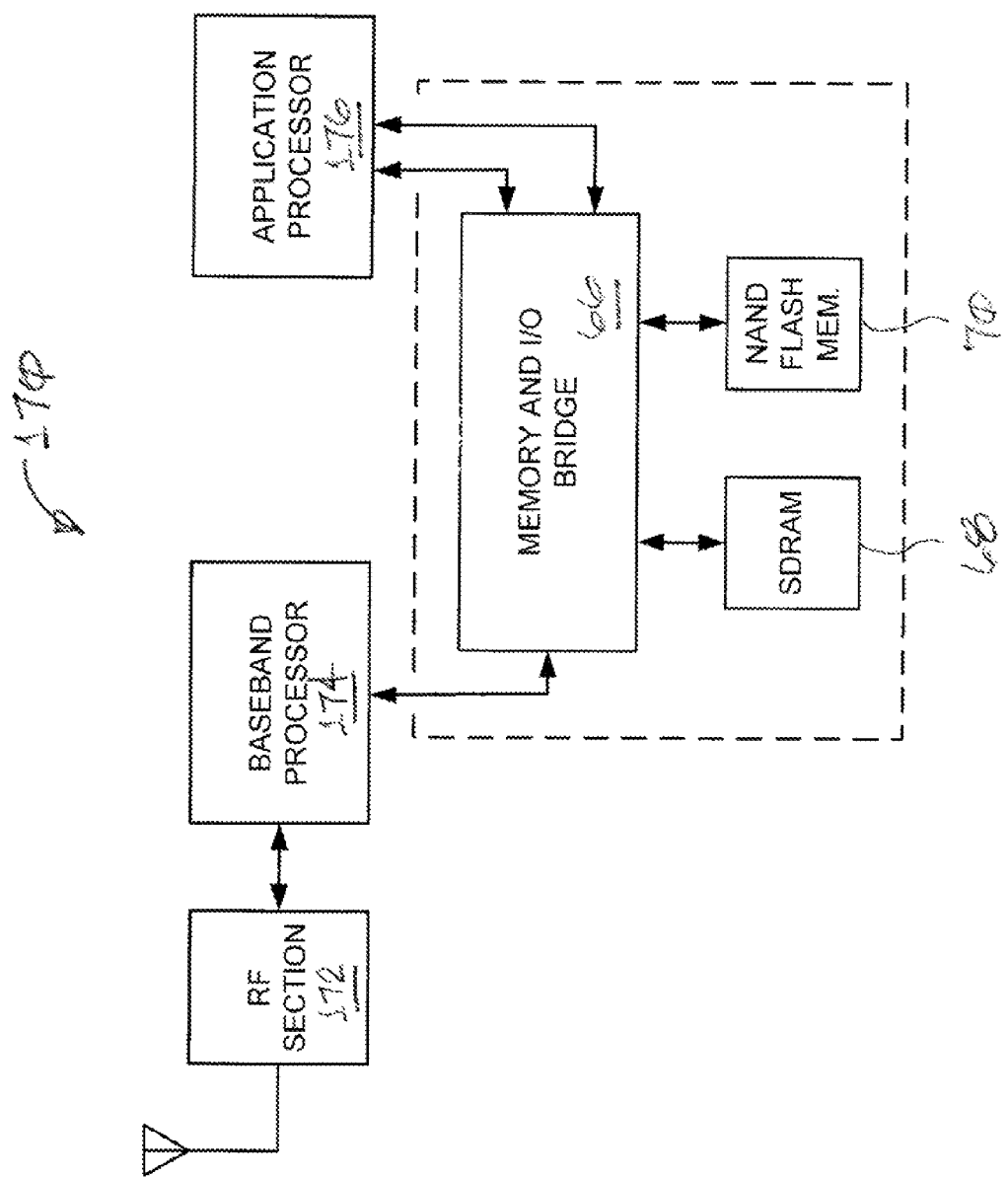
FIG. 8 is a diagram of one embodiment of a mobile telephone handset including two processors sharing a volatile memory and a nonvolatile memory via the memory and I/O bridge of FIGS. 3 and 4.

FIG. 8 is a diagram of one embodiment of a mobile telephone handset 170 including a radio frequency (RF) section 172, a baseband processor 174, and an application processor 176. In the embodiment of FIG. 8, both the baseband processor 174 and the application processor 176 are coupled to the memory and I/O bridge 66 of FIGS. 3 and 4. Via the memory and 110 bridge 66, the SDRAM 68 and the NAND flash memory 70 of FIG. 3 are shared by the baseband processor 174 and the application processor 176 in a transparent fashion. That is, the memory and I/O bridge 66 satisfies memory requests from the baseband processor 174 via SRAM access signals and protocol, and NOR flash memory access signals and protocol, using the SDRAM 68 and the NAND flash memory 70 such that the latency and timing requirements of the respective memory accesses are met. The memory and I/O bridge 66 also satisfies memory requests from the application processor 176 via SDRAM access signals and protocol, and NAND flash memory access signals and protocol, using the SDRAM 68 and the NAND flash memory 70 such that the latency and timing requirements of the respective accesses are met. The I/O controllers and interfaces in the memory and I/O bridge 66, and the dual port RAM 116 of FIG. 4, are also available to both the baseband processor 174 and the application processor 176.

It will be appreciated to those skilled in the art having the benefit of this disclosure that this invention is believed to include a memory and input/output (I/O) bridge circuit, multiprocessor systems including the memory and I/O bridge circuit, and a method for satisfying a NOR flash memory read request. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A method comprising:
receiving, at a first interface of a circuit, a first volatile memory read request from a first processor coupled with the circuit and satisfying the first volatile memory read request through accessing SDRAM of the circuit, the SDRAM configured to be coupled with an SDRAM controller of the circuit;
receiving, at the first interface, a first nonvolatile memory read request from the first processor and satisfying the first nonvolatile read request through accessing the SDRAM and NAND flash memory of the circuit, the NAND flash memory configured to be coupled with a NAND flash memory controller of the circuit;
receiving, at a second interface of the circuit, a second volatile memory read request from a second processor coupled with the circuit and satisfying the second volatile memory read request through accessing the SDRAM;
receiving, at a third interface of the circuit, a second nonvolatile memory read request from the second processor and satisfying the second nonvolatile memory read request through accessing the NAND flash memory; and
carrying out interprocessor communication between the first processor and the second processor utilizing a dual port random access memory (RAM) of the circuit, the dual port RAM comprising an addressable memory location accessible to the first processor and the second processor, the first nonvolatile memory read request comprising NOR flash memory access signals, and the first volatile memory read request comprising static random access memory (SRAM) access signals.

2. A method comprising:
receiving a first volatile memory read request from a first processor and accessing a volatile memory responsive to the first volatile memory read request;
receiving a first nonvolatile memory read request from the first processor and accessing the volatile memory and a non-volatile memory responsive to the first nonvolatile read request;
receiving a second volatile memory read request from a second processor and accessing the volatile memory responsive to the second volatile memory read request;
receiving a second nonvolatile memory read request from the second processor and accessing the non-volatile memory responsive to the second nonvolatile memory read request; and
scheduling an order of accessing the volatile memory or the nonvolatile memory responsive to at least one of the first volatile memory read request, the first nonvolatile memory read request, the second volatile memory read request, and the second nonvolatile memory read request to meet latency and timing requirements.

3. The method of claim 2, wherein the receiving of the first volatile memory read request from the first processor includes receiving static random access memory (SRAM) access signals, and the accessing of the volatile memory responsive to the first volatile memory read request includes accessing a synchronous dynamic random access memory (SDRAM).

4. The method of claim 2, wherein the receiving of the first nonvolatile memory read request from the first processor includes receiving NOR flash memory access signals, and the accessing of the nonvolatile memory responsive to the first nonvolatile memory read request includes accessing a NAND flash memory.

5. The method of claim 2, wherein the receiving of the second volatile memory read request from the second processor includes receiving synchronous dynamic random access memory (SDRAM) access signals, and the accessing of the volatile memory responsive to the second volatile memory read request includes accessing the SDRAM.

6. The method of claim 2, wherein the receiving of the second nonvolatile memory read request from the second processor includes receiving NAND flash memory access signals, and accessing of the nonvolatile memory responsive to the second nonvolatile memory read request includes accessing the NAND flash memory.

7. The method of claim 2, wherein the accessing of the volatile memory and the nonvolatile memory responsive to the first nonvolatile read request includes transferring requested data from the nonvolatile memory to the volatile memory using a direct memory access (DMA) operation.

8. The method of claim 2, wherein the scheduling the order of accessing the nonvolatile memory includes scheduling the order responsive to priority information associated with NOR flash memory access signals and NAND flash memory signals, and the accessing of the nonvolatile memory includes accessing a NAND flash memory in the scheduled order.

9. The method of claim 2, wherein the accessing of the nonvolatile memory includes accessing a NAND flash memory through a universal serial bus.

10. A memory interface comprising:
a transaction interleaver coupled with a first processor through a first interface and a second processor through a second interface and a third interface, the transaction interleaver further coupled to a volatile memory and a nonvolatile memory, the transaction interleaver configured to:
receive a first volatile memory read request from the first processor through the first interface and satisfy the first volatile memory read request through the volatile memory;
receive a first nonvolatile memory read request from the first processor through the first interface and satisfy the first nonvolatile read request through the volatile memory and the nonvolatile memory;
receive a second volatile memory read request from the second processor through the second interface and satisfy the second volatile memory read request through the volatile memory;
receive a second nonvolatile memory read request from the second processor through the third interface and satisfy the second nonvolatile memory read request through accessing the nonvolatile memory; and
schedule an order of satisfaction of at least one of the first volatile memory read request, the first nonvolatile memory read request, the second volatile memory read request, and the second nonvolatile memory read request in an order that meets latency and timing requirements.

11. The memory interface of claim 10, wherein the first volatile memory read request comprises static random access memory (SRAM) access signals and the volatile memory comprises synchronous dynamic random access memory (SDRAM).

12. The memory interface of claim 10, wherein the first nonvolatile memory read request comprises NOR flash memory access signals and the nonvolatile memory comprises NAND flash memory.

13. The memory interface of claim 10, wherein the second volatile memory read request comprises synchronous dynamic random access memory (SDRAM) access signals the volatile memory comprises SDRAM.

14. The memory interface of claim 10, wherein the second nonvolatile memory read request comprises NAND flash memory access signals and the nonvolatile memory comprises NAND flash memory.

15. The memory interface as recited in claim 14, wherein the second nonvolatile memory read request comprises NAND memory access signals forwarded from the second processor to the memory interface.

16. The memory interface of claim 10, further comprising a direct memory access controller (DMA), wherein the satisfaction of the first nonvolatile read request through the volatile memory and the nonvolatile memory includes the DMA controller configured to transfer requested data from the nonvolatile memory to the volatile memory through a DMA operation, wherein the transaction interleaver is configured to access the transferred requested data in the volatile memory.

17. The memory interface of claim 10, wherein the first nonvolatile memory read request includes NOR flash memory access signals, the second nonvolatile memory read request includes NAND flash memory access signals, and the nonvolatile memory includes NAND flash memory, wherein the transaction interleaver is configured to schedule the order of satisfaction of the first nonvolatile memory read request and the second nonvolatile memory read request based on priority information associated with at least one of the NOR flash memory access signals and the NAND flash memory access signals.

18. The memory interface as recited in claim 10, further comprising a configuration register containing priority information, which is used by the transaction interleaver to schedule the order in which the first and second nonvolatile memory read requests are satisfied.

19. The memory interface as recited in claim 10, further comprising a dual port RAM configured to facilitate a grant of access to the first processor or the second processor via data stored in at least one memory location of the dual port RAM.

20. The memory interface of claim 10, further comprising a universal serial bus (USB) interface, wherein the nonvolatile memory comprises NAND flash memory that is accessible through the USB interface.

* * * * *